US008838603B1

(12) United States Patent  
Djabarov et al.

(10) Patent No.: US 8,838,603 B1
(45) Date of Patent: Sep. 16, 2014

(54) INTERACTIVE SEARCH QUERYING

(75) Inventors: Gueorgui N. Djabarov, Tucson, AZ (US); Alex B. Harper, Santa Clara, CA (US); Stuart B. Morgan, Los Angeles, CA (US); David I. MacLachlan, Redmond, WA (US); Michael D. Pinkerton, Ashburn, VA (US); John Nicholas Jitkoff, Mountain View, CA (US); Ryan C. Tabone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/474,853

(22) Filed: May 18, 2012

Related U.S. Application Data

(63) Continuation of application No. 12/556,457, filed on Sep. 9, 2009, now Pat. No. 8,204,897.

(60) Provisional application No. 61/095,531, filed on Sep. 9, 2008.

(51) Int. Cl.
 *G06F 17/30* (2006.01)
(52) U.S. Cl.
 CPC .................. *G06F 17/30705* (2013.01)
 USPC ........................................ 707/737
(58) Field of Classification Search
 CPC .......... G06F 17/3053; G06F 17/30598; G06F 17/3097; G06F 17/30705; G06F 17/3064
 USPC .......................... 707/765–768, 737–738, 723
 See application file for complete search history.

(56) References Cited

U.S. PATENT DOCUMENTS

| 2003/0033288 | A1 | 2/2003 | Shanahan et al. |
| 2005/0015366 | A1* | 1/2005 | Carrasco et al. ................. 707/3 |
| 2006/0047649 | A1* | 3/2006 | Liang ................................ 707/4 |
| 2006/0080292 | A1 | 4/2006 | Alanzi |
| 2006/0080303 | A1* | 4/2006 | Sargent et al. ................... 707/3 |
| 2006/0248078 | A1 | 11/2006 | Gross et al. |
| 2007/0288648 | A1 | 12/2007 | Mehanna et al. |
| 2009/0112848 | A1* | 4/2009 | Kunjithapatham et al. ....... 707/5 |
| 2009/0171929 | A1* | 7/2009 | Jing et al. ........................ 707/5 |

OTHER PUBLICATIONS

Josh Karlin, "Launchy: The Open Source Keystroke Launcher for Windows"[online] http://www.launchy.net [copyright Feb. 13, 2008].
"Colibri—Type Ahead—Information at the Tips of your Wings" [online] http://colibri.leetspeak.org (dated Feb. 15, 2008) 1 page.
"Google Desktop—Features" [online] http://desktop.google.com/ (dated Feb. 13, 2008) pp. 1-2.
"Quicksilver Overview", [online] http://docs.blacktree.com/quicksilver/what_is quicksilver (dated Feb. 7, 2008) pp. 1-2.

* cited by examiner

*Primary Examiner* — Thu-Nguyet Le
(74) *Attorney, Agent, or Firm* — Fish & Richardson P.C.

(57) ABSTRACT

The subject matter of this specification can be implemented in, among other things, a computer-implemented method including receiving a partial query term from a user. The method further includes providing the partial query term to multiple data provider modules. Additionally, the method includes receiving a set of search suggestion items responsive to the partial query term and receiving information identifying a category for each search suggestion item. The method further includes rendering a representation of each search suggestion item, and receiving a user selection identifying one of the search suggestion items from the user interface. And, the method includes rendering a status bar indicating the user selection.

21 Claims, 8 Drawing Sheets

ND QUERYING

CROSS-REFERENCE TO RELATED APPLICATIONS

This application is a continuation of U.S. patent application Ser. No. 12/556,457 filed on Sep. 9, 2009, and claims the benefit of U.S. Provisional App. Ser. No. 61/095,531, filed on Sep. 9, 2008, and entitled "Interactive Search Querying," both of which are hereby incorporated by reference in their entirety.

TECHNICAL FIELD

This instant specification relates to presenting query suggestions and query results to a user of a computing device.

BACKGROUND

Search engines are tools that identify, from a large corpus of information, the information that is relevant to a query for a user. Such a query can be explicit, such as a string of characters typed into a search box on a computing device, or implicit, such as the submission of a geographic location by a computing device to retrieve search results that show various businesses in a user's area. Search engines continue to improve with respect to the accuracy of the information they provide to users, yet the corpuses of information through which they must travel to find relevant information continue to grow and grow. As a result, there is a constant struggle to identify the wheat from the chaff when attempting to deliver relevant results to a user.

Various techniques can be used by which to interact with a user to better understand the context of the information for which they are searching. For example, a user may be permitted to identify a particular corpus in which they would like to search, such as web, images, videos, their desktop, and other such corpuses. Also, a search engine can present suggested search terms for a user, such as terms that are similar to those the user entered, or that appear to be properly-spelled versions of the improperly-spelled term entered by a user. Users may also be allowed to refine search results so as to be presented with more targeted results if they do not deem the first round of results to be appropriate.

SUMMARY

In general, this document describes presenting query suggestions and query results to a user of a computing device. In a first aspect, a computer-implemented method includes receiving from a user, through a user interface of a search application at a computing device, a portion of a query that is less than a complete query. The method further includes providing the portion of the query to multiple data provider modules nearly simultaneously, each of the data provider modules able to search at least one data source using the portion of the query. The method further includes receiving, from ones of the data provider modules, a set of search suggestion items resulting from searching the data sources, each of the search suggestion items includes a rank and a relevance value, each of the ranks indicating a frequency for accessing the corresponding search suggestion item, and each of the relevance values indicating a level of match between the portion of the query and the search suggestion item. The method further includes determining a score for each of the search suggestion items by combining the rank and the relevance value for each of the search suggestion items. The method further includes sorting the search suggestion items using the scores. The method further includes presenting the sorted search suggestion items to the user.

Implementations can include any, all, or none of the following features. Combining the rank and the relevance value can include multiplying the rank by the relevance value. The frequency for accessing the corresponding search suggestion item can be determined over a prior predetermined time interval. The relevance values can be numbers in a range from zero to one, a relevance value of zero can indicate no match, and a relevance value of one can indicate a complete match.

The search suggestion items received from the data provider modules each can further include an identifier, such as a web page address, a file path, or a contact name. The method can include comparing the identifiers of the search suggestion items and removing from the sorted search suggestion items one or more of the search suggestion items having duplicate identifiers. Removing the one or more search suggestion items having the duplicate identifiers can include removing the one or more search suggestion items having lowest scores and having the duplicate identifiers.

The method can include storing, for each of the search suggestion items, an indication of a frequency with which the user selects the search suggestion items and combining the indication with the rank for each of the search suggestion items before combining the ranks and the relevance values. The method can include resetting the frequency, for each of the search suggestion items, at a reset time interval.

Providing the portion of the query to the data provider modules can include providing the portion of the query to a menu data provider module that searches a data source that includes menu items from one or more applications at the computing device that are external to the search application. Receiving, from ones of the data provider modules, the sets of search suggestion items resulting from searching the data sources can include receiving from the menu data provider a set of search suggestion items that includes one or more of the menu items of the applications that are external to the search application. The one or more applications that are external to the search application can include a foreground application. The one or more applications that are external to the search application can include open applications. The one or more applications that are external to the search application can include an operating system.

Providing the portion of the query to the data provider modules can include providing the portion of the query to a web browser data provider module that searches a data source that includes queries performed in one or more web browser applications that are external to the search application. Receiving, from ones of the data provider modules, the sets of search suggestion items resulting from searching the data sources can include receiving from the web browser data provider a set of search suggestion items that include one or more of the queries performed in the web browser applications that are external to the search application.

Providing the portion of the query to the data provider modules can include providing the portion of the query to a file data provider module that searches a data source that includes one or more files currently open in a application that can be external to the search application. Receiving, from ones of the data provider modules, the sets of search suggestion items resulting from searching the data sources can include receiving from the file data provider a set of search suggestion items that include contents from the one or more files currently open in the application that are external to the search application.

Presenting the sorted search suggestion items to the user can include presenting a predetermined number of the search suggestion items having the highest scores. The method can include grouping the search suggestion items into categories and wherein presenting the sorted search suggestion items to the user can include presenting the groups of sorted search suggestion items to the user. The method can include receiving from the user, through the computing device, an input that includes a restriction condition for the search suggestion items and restricting the search suggestion items to one or more of the search suggestion items that have a relationship with the restriction condition.

In a second aspect, a recordable media having recorded and stored thereon instructions, that when executed, perform actions including receiving from a user, through a computing device, a portion of a query that is less than a complete query. The actions further include providing the portion of the query to multiple data provider modules nearly simultaneously, each of the data provider modules able to search at least one data source using the portion of the query. The actions further include receiving, from ones of the data provider modules, a set of search suggestion items resulting from searching the data sources, each of the search suggestion items includes a rank and a relevance value, each of the ranks indicating a frequency for accessing the corresponding search suggestion item, and each of the relevance values indicating a level of match between the portion of the query and the search suggestion item. The actions further include determining a score for each of the search suggestion items by combining the rank and the relevance value for each of the search suggestion items. The actions further include sorting the search suggestion items using the scores. The actions further include presenting the sorted search suggestion items to the user.

Implementations can include any, all, or none of the following features. The frequency for accessing the corresponding item can be determined over a prior predetermined time interval. The frequency for accessing the corresponding search suggestion item can be computed as a function that weights accesses lower the farther in the past they occurred. The actions can further include comparing the identifiers of the search suggestion items and removing from the sorted search suggestion items one or more of the search suggestion items having duplicate identifiers.

In a third aspect, a computer-implemented system includes a user interface that receives from a computer user a portion of a query that is less than a complete query. The system further includes a data provider manager that provides the portion of the query to multiple data provider modules for searching multiple data sources using the portion of the query. The system further includes a merging module that receives, from ones of the data provider modules, a set of search suggestion items resulting from searching the data sources, each of the search suggestion items includes a rank indicating a frequency of accessing the corresponding search suggestion item, and a relevance value indicating how well the portion of the query matches the search suggestion item. The merging module determines a score for each of the search suggestion items by combining the rank and the relevance value, sorts the search suggestion items using the scores, and provides the sorted search suggestion items to the user interface for presentation to the user.

Implementations can include any, all, or none of the following features. The user interface or the data provider module can be programmed to convert the portion of the query into a revised form before providing the portion of the query to the data provider modules.

In a fourth aspect, a computer-implemented system includes a user interface that receives from a computer user a portion of a query that is less than a complete query. The system further includes a data provider manager that provides the portion of the query to multiple data provider modules for searching multiple data sources using the portion of the query. The system further includes means for combining suggestions from the multiple data sources into a sorted list of suggestions to be presented to the user.

The systems and techniques described here may provide one or more of the following advantages. First, a computing device can quickly provide search suggestions by searching data that resides on or is directly accessible by the computing device. Second, search suggestions from multiple sources, such as third party search suggestion plug-ins to a search application, can be scored, sorted, and presented in a way that is meaningful to a user viewing the search suggestions. Third, search suggestions provided with missing or inaccurate scoring information can be corrected by a search application that calculates the scores and sorts the search suggestions for presentation to a user.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for presenting query suggestions to a user of a computing device. In an example described herein, a user inputs a query into a search application. As the query is entered by the user, the search application presents suggestions for data items in which the user may be interested, based on the portion of the query received up to that point in time. A data item can be a standalone file, such as a document or an application. A data item can be within a file or can be provided by an application, such as an address book contact or a browser bookmark. The search application sorts the list of data items based on how frequently each data item has been accessed and how well each data item matches the query portion.

The search application receives the suggestions from data providers that have access to the documents, applications, and other data. The search application provides the portion of the query to the data providers and, in return, each data provider gives a list of suggestions to the search application. Each suggestion received from the data providers has an associated rank, such as in the form of rank values, and an associated relevance. The rank values, in one example, indicate how often the suggestion is accessed by the user in a particular time interval, such as, for example, the past seven days. The relevance values correspond to how well the suggestion matches the query portion. The search application combines each rank with its corresponding relevance to determine a score for each suggestion. The search application then sorts the suggestions based on the scores and presents the sorted suggestions to the user.

Figure 1:
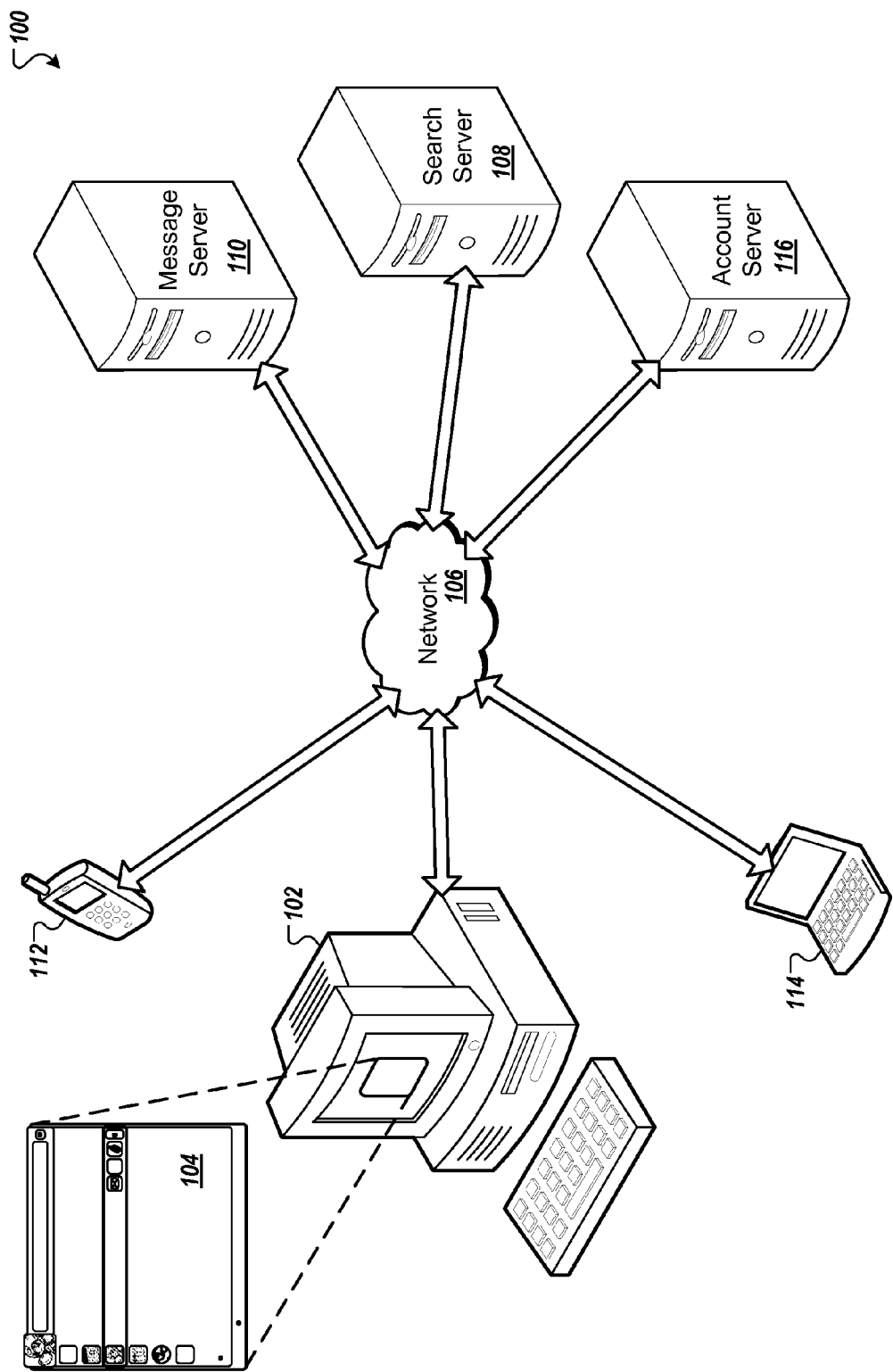
FIG. 1 is a schematic diagram showing an example of a system for presenting query suggestions to a user of a computing device.

FIG. 1 is a schematic diagram showing an example of a system 100 for presenting query suggestions to a user of a computing device 102. In particular, the computing device 102 includes a search application 104. A user of the computing device 102 can input a portion of a query using the search application 104. The search application 104 presents suggestions for the query portion in a display device of the computing device 102. Suggestions can include launching applications, opening files, and accessing other data within the computing device 102.

The suggestions can also include accessing remote computer devices over a network 106. For example, a suggestion can include sending the query portion to a search server 108. The search server 108 then uses the query portion to perform a search of web pages accessible over the network 106 and to return search results to the computing device 102. In another example, the suggestions can include previously performed search queries that are similar to or that contain the query portion entered by the user. The user can select a suggested previous query to request that the search server 108 perform the previous query again and return the results.

In some implementations, a suggestion can include mechanisms for launching a messaging application or sending a message. For example, the suggestion can include a command to launch an instant messaging application at the computing device 102 and to send an instant message through a messaging server 110 to a mobile computing device 112.

In some implementations, the user can receive the same suggestions at a second computing device 114 as would be produced at the computing device 102, so that the user can have a similar experience at multiple different devices. For example, the search application 104 can store the list of previously performed search queries at an account server 116. The list of previously performed search queries can be synchronized from the account server 116 to the second computing device 114. When the user accesses a search application at the second computing device 114, the suggestions can include search queries previously requested by the user while at the computing device 102. In addition, other data used for suggestions can be synchronized between two or more computing devices, such as web browser bookmarks. Some data used for suggestions may not be synchronized between computing devices. For example, data related to an application installed on a first computing device may not be relevant to a second computing device that does not include the application.

The computing device 102 may take a variety of forms, as may the search application 104. For example, the computing device may include a desktop or laptop computer, or a smartphone. The search application 104 may be a dedicated application, or a search page that is accessed through a web browser, where a server may provide interactive suggestions in the manner described here as a user enters data.

As one example of the operation of the techniques described here, a user of the computing device 102 may have a contact list that includes two individuals that the user contacts frequently, such as the user's husband, "Jim," and boss "Jill." After the user has entered the characters J and I, both of these entries are responsive, as may be a number of web-related results. A system may initially determine that contact records for each person may be responsive, and may assign a fairly high relevance values to each. The rank value for the husband may be higher than that for the boss (hopefully) because the user contacts or searches on, or otherwise addresses information for her husband more often than for her boss. The rank may be based on a number of interactions with a particular data record in a period, and the period can be extended to a long period, but with recent interactions weighted more heavily than more distant interactions, under a presumption that more recent interactions will be most relevant to the relevance scoring process. Suggestions relating to the two contacts for the user may then be displayed on the user's device. For example, the suggestions may include the names of each of the contacts, and the user may then select one of the suggestions to perform a search on those names (where the search may span both the local device and networked sources).

Such suggestions may be gathered and displayed, while other suggestions are being gathered over the internet, such as from a remote search engine. For example, the locally-sourced suggestions may be displayed immediately, and then may be shifted in position as additional suggestions are received from one or more remote servers. The newly received suggestions may be slotted into position by comparing relevance and rank values for those suggestions in relating to the already retrieved suggestions. For example, some web-retrieved suggestions in the above example may include the title to the Arnold Schwartzenegger movie "Jingle All the Way," Jib Jab, Jimmy Choo, or Jim Carey, where the rank values for web-retrieved suggestions can depend on prior recent usage by the particular user of the device that is receiving input or on prior recent usage by many individuals, such as by determining how often the term has been submitted to a search engine in the recent past. For example, "Jingle All the Way" might rise in value around California elections, Jib Jab might rise soon after that organization releases a humorous political video, and Jimmy Choo might rise when his shows are mentioned on a popular television program like Oprah.

Figure 2:
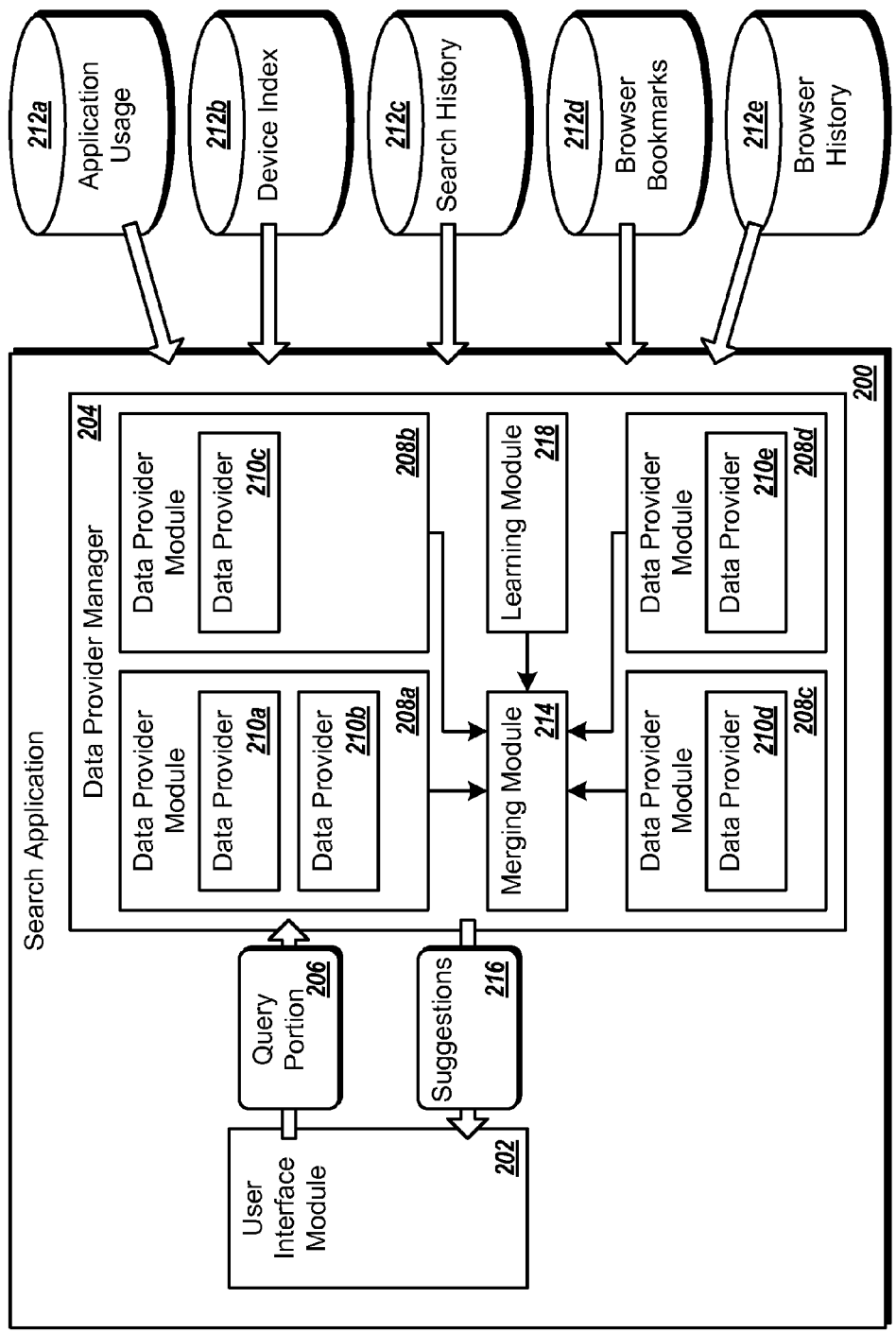
FIG. 2 is a block diagram showing an example of a search application for presenting query suggestions to a user of a computing device.

FIG. 2 is a block diagram showing an example of a search application 200 for presenting query suggestions to a user of a computing device. In general, the search application may operate to receive suggestions for completing user queries as the user types the queries, and to rank and display the suggestions to the user so that the user may select one of the suggestions and submit it as a complete query that may be transmitted to a remote search engine and applied on the computing device itself also.

The search application 200, which may take the form of the search application 104 in FIG. 1, includes a user interface module 202 and a data provider manager 204. The user interface module 202 receives inputs from the user, such as keystrokes that form a query portion 206, or an incomplete query (e.g., one for which the user is still typing characters and has not yet hit an "enter" or "submit" key or button). The user interface module 202 provides the query portion 206 to the data provider manager 204.

The data provider manager 204 manages multiple data provider modules 208a-d. In some implementations, the data provider modules 208a-d are plug-ins to the search application 200. The plug-in architecture allows third party developers to create additional data providers and corresponding suggestion items from additional data sources accessed by the additional data providers. In some implementations, the plug-ins are application program interfaces (APIs) in a computer program language, such as Java or C++. The plug-ins implement a class having a name, properties, and/or methods that are known to the search application 200.

Each of the data provider modules 208a-d is associated with one or more data providers 210a-e. The data providers 210a-e provide access to one or more data sources 212a-e, respectively. In particular, the data provider manager 204 forwards the query portion 206 to each of the data provider modules 208a-d. In some implementations, the data provider modules 208a-d abstract the access of the data sources 212a-e away from the search application 200. That is, the search application 200 need not directly access the data sources 212a-e or know how to access the data sources 212a-e. Also, the data provider manager 204 may modify the query portion 206 in some manner so that the literal portion is not provided, but data is provided so as to obtain information responsive to the query portion.

The data provider modules 208a-d can include, for example, an application launcher module, a web search suggestion module, a web page bookmark suggestion module, and a previously visited web page module, respectively. Each of the data providers 210a-c perform a search of at least one corresponding data source using the query portion 206.

For example, the query portion 206 entered by the user may include a series of text characters, "cal." The user interface module 202 forwards the "cal" query portion to the data provider manager 204. The data provider manager 204 passes the "cal" query portion to each of the data provider modules 208a-d.

The data provider module 208a for launching applications passes the "cal" query portion to the data providers 210a-b. The data provider 210a performs a search of the data source 212a to identify application usage information that matches the "cal" query portion. For example, the user may have recently accessed a "Calendar Application" and the access may be recorded in the application usage information. The data provider 210a identifies the "Calendar Application" in the application usage information as matching the "cal" query portion. The data provider 210a passes the "Calendar Application" suggestion back to the data provider module 208a.

The search application 200 can maintain the application usage information or the application usage information can be maintained by another application, such as the operating system (OS) of the computing device 102. In some implementations, the data provider 210a can retrieve application usage information from the OS and compare it to the query portion 206 to determine suggestions.

The data provider 210b performs a search of the data source 212b to identify applications in an index of files stored at or accessible by the computing device 102 that match the "cal" query portion. For example, the device index may include a reference to the "Calendar Application." The data provider 210b identifies the "Calendar Application" in the device index as matching the "cal" query portion. The data provider 210b passes the "Calendar Application" suggestion back to the data provider module 208a. In some implementations, the data provider 210b searches predetermined locations for applications matching the query portion 206, such as a home folder, a desktop folder, or a folder designated for program files. In some implementations, the data provider 210a searches for links to applications in a predetermined location, such as in a quick launch area provided by the OS or a start menu provided by the OS.

The suggestions provided by the data providers 210a-b include an identifier of the suggestion. In this case, a file name of an application and possibly a path or arguments passed to the application. The data providers 210a-b also pass a rank value and relevance value for each suggestion.

In some implementations, the data providers 210a-b determine the ranks (e.g., a predicted number of accesses for a predetermined time period, such as the next seven days) of the application suggestions from the application usage information. For example, the data provider 210a can use the number of accesses of the "Calendar Application" for the last seven days as a prediction of the number of access for the next seven days.

In some implementations, the data providers 210a-b determine the relevance values by comparing the number of characters from the query portion 206 that match a portion of the suggestion (e.g., the identifier) to the number of characters that do not match the portion of the suggestion. In addition, the relevance values can be weighted. For example, a suggestion from the quick launch area or the start menu may have a higher relevance value than a suggestion from the program files folder or the desktop folder. In some implementations, each of the relevance values include a number from zero to one. In some implementations, a relevance value of zero indicates no relevance and a relevance value of one indicates a complete match or high relevance.

The data provider modules 208b-d and the data providers 210c-e perform similar operations. Each of the data providers 210c-e use the query portion 206 to identify suggestions from the data sources 212c-e, respectively. The data providers 210c-e determine identifiers, ranks, and relevance values for the identified suggestions. For example, the data provider 210c can determine web search suggestions from previously requested web search queries stored in the data source 212c. In another example, the data providers 210d-e may determine Uniform Resource Locators (URLs) of web pages from the browser bookmarks and the browser history that match the query portion 206. The data providers 210d-e may use the URLs as identifiers of the suggestions.

Again, the search application 200 and/or the data providers 210a-e can maintain the data in the data sources 212a-e or another application program or the OS can maintain the data in the data sources 212a-e. In some implementations, one or more of the data providers 210a-e access the data in the data sources 212a-e directly, such as by accessing a file in a folder or an item in a database. In some implementations, one or more of the data providers 210a-e access the data in the data sources 212a-e by communicating through another application, such as an application that maintains the data source.

The data providers 210a-e provide the suggestions to a merging module 214. The merging module 214 determines scores for each of the received suggestions by multiplying each rank with the corresponding relevance value. For example, the "Calendar Application" suggestion from the data provider 210a may have a rank of ten and a relevance of one half. In this case, the merging module 214 determines a score for the suggestion of five. In some implementations, the merging module 214 can use another formula to calculate the scores.

The merging module 214 removes duplicates from the suggestions. For example, if the identifiers for two or more suggestions match then the merging module 214 removes the duplicate suggestions. In some implementations, the merging module 214 removes the duplicate suggestions having the lowest scores. One or more suggestions 216 now remain that are unique with respect to the identifiers.

The merging module 214 sorts the suggestions 216 by the scores. The merging module 214 outputs the suggestions 216 to the user interface module 202. The user interface module 202 presents the suggestions 216 to the user.

In some implementations, the merging module 214 does not completely remove the duplicates from the suggestions 216. The merging module 214 may group the duplicates together in the list of the suggestions 216 and collapse the duplicates. The collapsed duplicates may be represented by the user interface module 202 with a user input control. The user can select the user input control to request that the duplicates be expanded and displayed.

In some implementations, a learning module 218 modifies the ranks determined by the data providers 210a-e. The learning module 218 determines a number of times that the user has accessed each of the suggestions for a particular query portion. The learning module 218 determines the number of times the user selects each of the suggestions associated with a particular query portion during a predetermined time period, such as seven days. The learning module 218 adds this amount for each suggestion to the corresponding rank of each suggestion associated with the particular query portion.

For example, a user can input a query portion that includes the text "cal." The search application 200 presents suggestions to the user, including a calculator suggestion. The user selects the calculator suggestion. The user selection of the calculator suggestion for the "cal" query portion is recorded, such as by the learning module 218 or another module. During subsequent searches using the query portion "cal," the learning module 218 increases the rank of the calculator suggestion according to the number of times the calculator suggestion was selected in response to the "cal" query portion.

In some implementations, the learning module 218 determines an average number of accesses for the predetermined time interval. For example, the learning module 218 can average the past four weeks of accesses for each suggestion to determine an average number of accesses for a seven day period.

In some implementations, the learning module 218 normalizes the number of accesses to a seven day time period. For example, if the number of accesses occurs over a period longer than seven days, the learning module 218 can proportionally scale the number of accesses down to a number equivalent to seven days of access. Conversely, if the number of accesses occurs over a period shorter than seven days, the learning module 218 can proportionally scale the number of accesses up to a number equivalent to seven days of access.

In some implementations, the learning module 218 tracks and records usage information for suggestions, such as when the user selects a suggestion presented in association with the query portion 206. Alternatively, the learning module 218 can retrieve the suggestion usage information from a storage maintained by another application, such as the application usage information previously described. In some implementations, the learning module 218 resets the number of accesses for each suggestion every four weeks. Alternatively, the learning module 218 can average or scale a rolling window of the past four weeks. For example, each week, the learning module 218 can drop access information for the oldest week and begin collecting information for the current week.

The learning module 218 provides the modifications of the ranks to the merging module 214. The merging module 214 scores, sorts, and provides the suggestions for presentation as previously described. In some implementations, the modifications made by the learning module 218 allows suggestions that are frequently accessed by the user or only recently accessed by the user to be promoted over suggestions rarely accessed or accessed less recently. In some implementations, the reset interval (e.g., four weeks) and the normalized modification interval (e.g., seven days) are chosen to be relatively unaffected by a user's temporary period of absence, such as a vacation, and yet responsive to the user's changes in suggestion access behavior over time.

In some implementations, the learning module 218 or the merging module 214 can apply a correction to the rank or relevance values from a particular data provider or data provider module. For example, if over time the suggestion selections made by the user are not proportional to the scores of the suggestions, the search application 104 can adjust the ranks and/or relevance values to correct the disproportion.

In some implementations, the search application 104 retrieves rank and/or relevance correction information from an external source, such as the account server 116. The account server 116 may receive suggestion selection information from many search applications. The account server 116 can determine if the average ranks and/or relevance values over many users from a particular data provider or data provider module do not match the frequency with which the users select suggestions from the particular data provider or data provider module.

Figure 3:
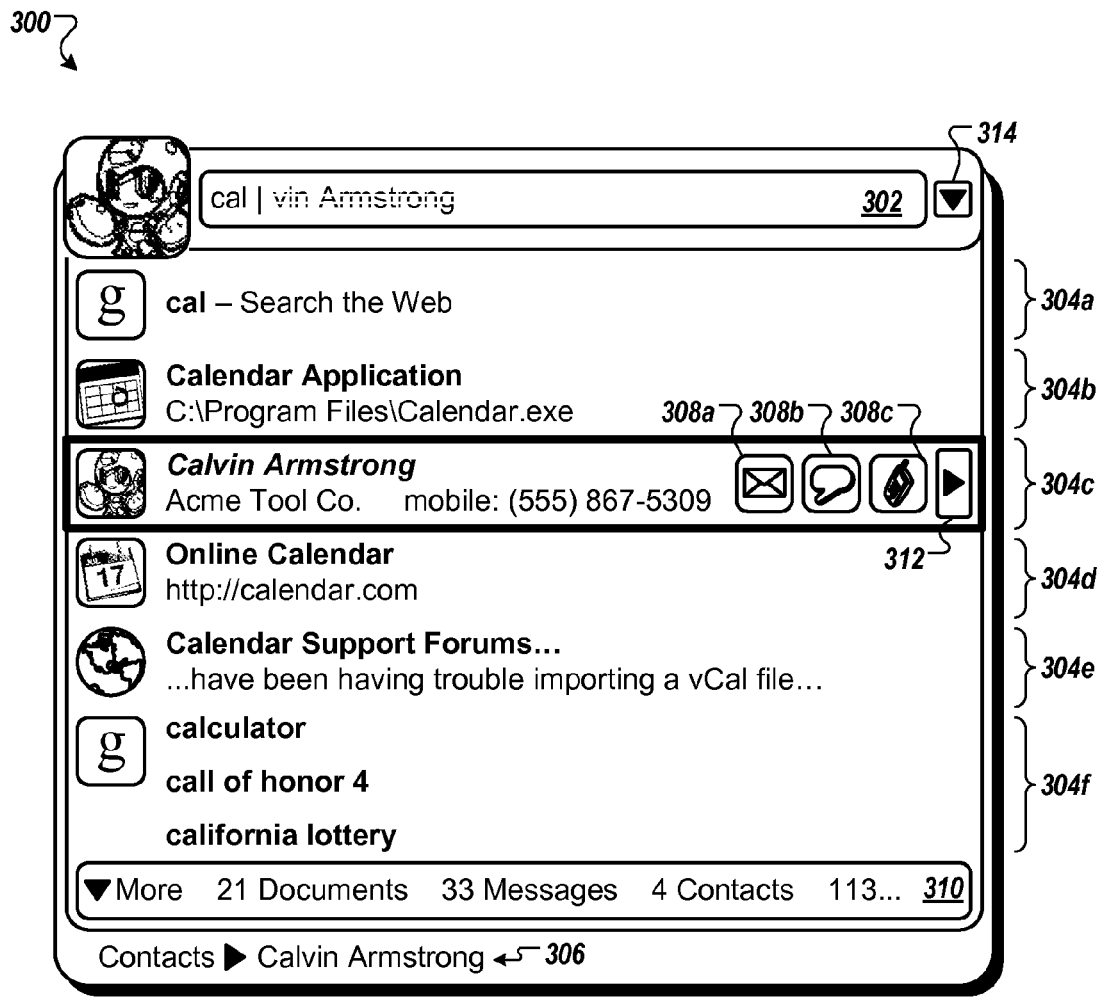
FIG. 3 is an example of a user interface for presenting query suggestions to a user of a computing device.

FIG. 3 is an example of a user interface 300 for presenting query suggestions to a user of a computing device. The user interface 300 includes a query input control 302. The query input control 302 includes a query portion "cal" that has been entered by the user. The user interface 300 includes multiple suggestions 304a-f generated by data providers, such as the data providers 210a-e, using the query portion "cal."

The suggestions 304a-f can be sorted, as previously described, by the merging module 214. In some implementations, the merging module 214 places a particular suggestion type at the top of the list of suggestions. For example, the merging module 214 can include a rule to place the suggestion 304a for a web search from the data provider 210c at the top of the list. The merging module 214 sorts the remaining suggestions according to their scores. The data providers 210a-b generate the suggestions 304b-c for a calendar application and an address book application, respectively. The data provider 210d generates the suggestion 304d for a bookmark to a calendar web page. The data provider 210e generates the suggestion 304e for a previously viewed web page and the suggestion 304f for previously entered Internet search phrases.

In some implementations, the user can navigate through the suggestions 304a-f by selecting a suggestion with a pointing device. In some implementations, the user can navigate through the suggestions 304a-f using other commands, such as up and down commands from a keyboard. As the user selects a suggestion the query input control 302 is updated to reflect the selection. For example, the remainder of an identifier for an item that matches the query portion can be appended to the query portion. Alternatively, or in addition, the entire matching identifier can be appended to the query portion, for example, within parentheses. In some implementations, the cursor for the current location of text input remains just after the query portion that the user has entered.

As shown in FIG. 3, the user has selected the suggestion 304c for an address book contact named Calvin Armstrong. Accordingly, the search application adds the remainder of the identifier, "vin Armstrong," to the text in the query input control 302 along with a visual indication, such as stippling or graying, to show that the query portion has been automatically completed. The search application also highlights the suggestion 304c, for example with a bold border or a different background color, to indicate that the suggestion 304c has been selected.

In addition, the search application indicates the location of the selected suggestion in a status bar 306 of the user interface 300. The status bar 306 currently indicates the suggestion 304c is in a "Contacts" folder or part of a "Contacts" application. The status bar 306 also indicates that the suggestion 304c has a name or identifier of "Calvin Armstrong." In some implementations, the status bar 306 can include other information such as a folder path, for example, where the selected suggestion is a file. In some implementations, the information presented in the status bar 306 is dependent on the type of suggestion selected. For example, the data provider or data provider module that provides a particular suggestion can also provide information to be presented in the status bar 306 when the suggestion is selected.

The search application adds one or more action controls 308a-c to the user interface 300 for the selected suggestion. The action controls 308a-c include a button for sending an email to the selected contact suggestion, starting an instant message chat session with the selected contact suggestion, and starting a voice chat session with the selected contact suggestion, respectively. In some implementations, the number and type of action controls for a particular suggestion item is based on the type of suggestion item. For example, the suggestion 304c for a contact includes actions for communicating with the contact, while the suggestion 304b for the calendar application may include other actions, such as an action for opening the calendar or adding a new appointment to the calendar.

In some implementations, a user can activate one or more of the action controls 308a-c by selecting the action control using a pointing input device, such as a mouse or touch pad. In some implementations, the user can activate one or more of the action controls 308a-c using a non-pointing device, such as a keyboard or voice input. For example, the user can navigate through suggestions by inputting up and down keyboard commands and the user can navigate through actions by inputting left and right keyboard commands. In some implementations, once focus has been placed on an action control, the user can activate or select the action control by inputting a command, such as a tab keyboard command, an enter keyboard command, or a verbal command.

In some implementations, action controls are continually shown for all of the suggestions 304a-f. In some implementations, action controls are only shown for the currently selected suggestion. In some implementations, a suggestion can include an input control for accessing a pop-up menu of additional action controls, for example, where the number of controls is greater than the space available in the suggestion item.

In some implementations, the actions associated with a particular suggestion can be provided by the data providers and/or data provider modules. For example, each data provider or data provider module can provide a list of actions along with each suggestion provided to the search application.

In some implementations, the search application can provide actions for suggestions. In some implementations, the search application provides one or more default actions if the data provider or data provider module does not provide a corresponding action. For example, the search application can provide a default "open" action for certain types of suggestion items. The default "open" action may be used to open or activate the suggestion item. The search application may provide other default actions, such as a "send to recipient" action, a "send to printer" action, or a "copy" action.

Figure 4:
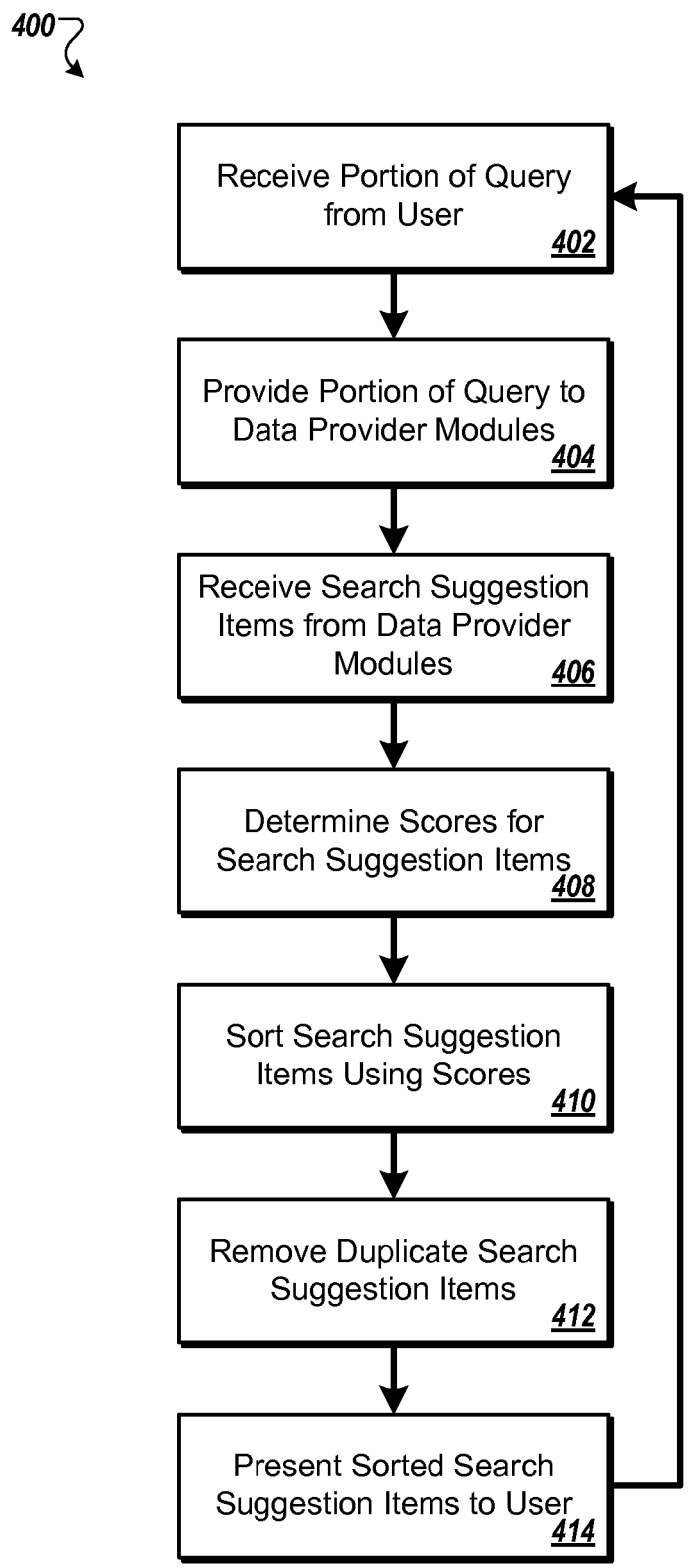
FIG. 4 is a flow chart showing an example of a process for presenting query suggestions to a user of a computing device.

FIG. 4 is a flow chart showing an example of a process 400 for presenting query suggestions to a user of a computing device. The process 400 may be performed, for example, by a system such as the system 100. For clarity of presentation, the description that follows uses the system 100 as the basis of an example for describing the process 400. However, another system, or combination of systems, may be used to perform the process 400.

The process 400 begins with receiving (402) a portion of a query from a user. For example, the user interface module 202 receives the query portion 206 including the text "cal."

The process 400 provides (404) the portion of the query to multiple data provider modules. For example, the data provider manager 204 receives the query portion 206 from the user interface module 202 and passes the query portion 206 to the data provider modules 208a-d.

The process 400 receives (406) search suggestion items from the data provider modules. The search suggestion items each include a rank and a relevance value. For example, the data providers 210a-e perform searches of the data sources 212a-e, respectively, using the query portion 206. The data providers 210a-e provide the results of the searches to the merging module 214 as the suggestion items. The data providers 210a-e generate rank and relevance values for each of the suggestion items as well as an identifier.

The process 400 determines (408) scores for each of the search suggestion items. For example, the learning module 218 can modify the ranks by adding a normalized number of accesses for each suggestion for the past seven days. The merging module 214 multiplies the modified rank with the relevance value for each of the suggestion items to determine a score for each of the suggestion items.

The process 400 sorts (410) the search suggestion items using the scores. For example, the merging module 214 sorts the scored suggestion items into a list from a highest to a lowest score. In some implementations, the merging module 214 places a particular type of suggestion item at a particular location in the list, such as by placing web search suggestions at the top of the sorted list. In some implementations, the merging module 214 separates the suggestion items into multiple categories, such as categories for each data provider or data provider module. In some implementations, the categories are independent of the data providers or data provider modules, such as categories based on the types of the suggestion items. For example, type based categories can include a web page type, a contact type, an email type, an application type, an image type, an audio type, and a video type. In this type based example, web pages from two separate data providers or data provider modules can be grouped in the same category. The merging module 214 can sort the suggestion items within each category, for example, from a highest score to a lowest score.

The process 400 removes (412) duplicate search suggestion items. For example, the merging module 214 compares the identifiers of the suggestion items to determine if duplicate identifiers exist. In some implementations, the merging module 214 removes the duplicate suggestion items. In some implementations, the merging module 214 hides the duplicate suggestion items, such as by grouping matching duplicates together and collapsing the duplicate group.

The process 400 presents (414) the sorted search suggestion items to the user. For example, the merging module 214 provides the sorted non-duplicate suggestion items to the user interface module 202. The user interface module 202 presents the suggestion items to the user in a graphical user interface (GUI), such as the user interface 300. In some implementations, the search application 200 also presents actions in association with one or more of the suggestion items presented by the user interface module 202.

In some implementations, the process 400 ends when the user selects a search suggestion item and a corresponding application is initiated or brought to the foreground. In some implementations, when the process 400 ends, the search application closes or hides the user interface of the search application. In some implementations, the process 400 repeats (402) if the user inputs an additional portion of the query.

Referring again to FIG. 3, the user interface 300 includes a more control 310. The user can select the more control 310 to request that additional suggestions not currently presented be shown in the user interface 300. In some implementations, the user interface 300 extends downward to accommodate the list of suggestions provided by the data provider modules. In some implementations, the user interface 300 initially only includes the query input control 302 prior to the query portion being entered by the user. In some implementations, the user interface 300 has a maximum extent to which the list of suggestions extends. The search application then adds the more control 310 to the user interface 300 indicating that more suggestions exist than are currently presented.

The more control 310 includes indications of how many additional non-presented suggestions exist in various categories. For example, twenty-one additional document type suggestions are not currently presented, thirty-three additional message type suggestions are not currently presented, four additional contact type suggestions are not currently presented, and one hundred and thirteen other suggestions are not currently presented. In some implementations, if the more control 310 does not include enough remaining space to present the name of a category or type, then the search application can replace a portion of the name with ellipsis (e.g., " . . . ").

Figure 5:
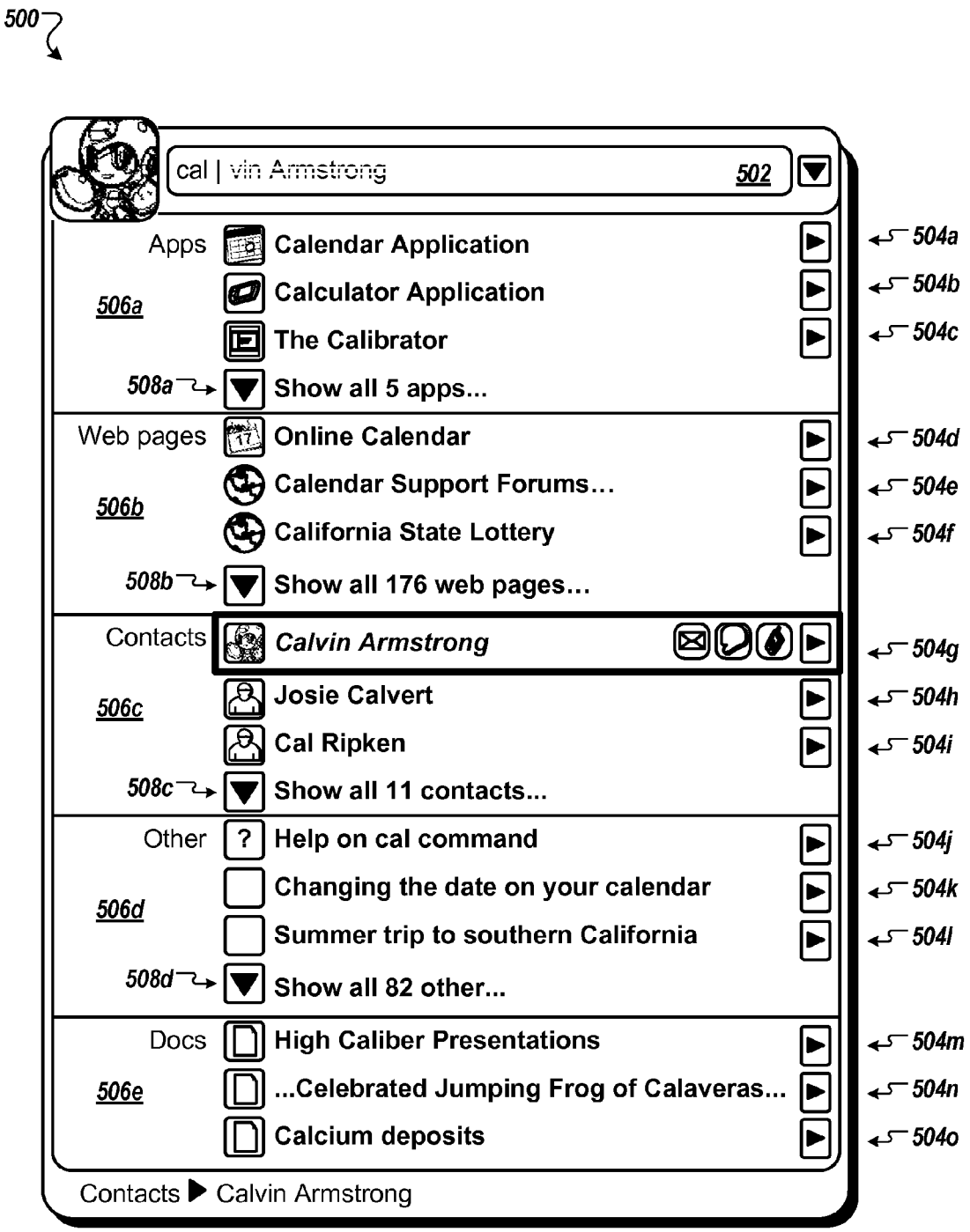
FIG. 5 is an example of a user interface for presenting additional query suggestions.

FIG. 5 is an example of a user interface 500 for presenting additional query suggestions. For example, the user interface 500 showing additional suggestions may result from a user selecting the more control 310 within the user interface 300. The user interface 500 includes a query input control 502. The user interface 500 includes multiple suggestions 504a-o. The search application has separated the suggestions 504a-o into multiple categories 506a-e including applications, web pages, contacts, other, and documents, respectively.

In some implementations, the search application maintains the selected suggestion ("Calvin Armstrong") as the search application transitions from the user interface 300 to the user interface 500. In some implementations, the search application maintains the query portion ("cal") entered by the user in the query input control 502 as the search application transitions between user interfaces. Accordingly, the search application can auto-complete ("vin Armstrong") the text in the query input control 502 based on the query portion and the selected suggestion as previously described.

The user interface 500 also includes multiple chow all controls 508a-d corresponding to the categories 506a-d that include more suggestions than those currently presented in the user interface 500. The user can select a show all control to request that all of the suggestions for the corresponding category be presented. Each of the show all controls 508a-d include an indication of the number of suggestions for the corresponding category (e.g., show all five applications).

In the example shown here, the search application presents the top three suggestions from each of the categories 506a-e.

In some implementations, the search application can present another number of suggestions, such as a smaller number, a larger number, a variable number of suggestions based on the scores of the suggestions, and/or a variable number of suggestions based on the space available in the user interface 500. For example, if the category 506a has suggestions with higher average scores than the category 506b, then the search application may include more suggestions from the category 506a than the category 506b. In some implementations, the number of suggestions presented from each category is proportional to the scores of the suggestions in the categories (e.g., proportional to the average scores of the categories or proportional to the total of the scores from each category).

Referring again to FIG. 3, the user interface 300 includes a restriction control 312. The user can select the restriction control 312 to request that the list of suggestions be restricted to include only items related to the suggestion 304c. When a restriction condition is applied, the search application filters the list of suggestions to only include items related to the selected restriction. For example, when restricting to the suggestion 304c (e.g., the contact Calvin Armstrong is a restriction condition), the search application may filter the list to include suggestions for the action controls 308a-c, additional actions for the contact Calvin Armstrong, or other items related to Calvin Armstrong, such as messages sent to or received from Calvin Armstrong.

In some implementations, the user can request restriction by selecting the restriction control 312 with a pointing device, a keyboard command, or a verbal command. In some implementations, the user can request a restriction on the suggestion 304c without selecting the restriction control 312, such as by inputting a tab keyboard command while the suggestion 304c is selected.

In some implementations, the user interface 300 includes an additional restriction control 314. The user can select the additional restriction control 314 to open a menu of items from which to restrict the list of suggestions. For example, the menu of items may include suggestion categories or types not currently presented in the user interface 300. This can allow the user to quickly restrict the list of suggestions without navigating through the list to find a suggestion of the desired category or type on which to restrict. For example, the menu of restriction items can include types of suggestions, such as web pages or address book contacts. In another example, the menu of restriction items can include specific suggestions, such as a specific web page (e.g., http://calendar.com) or a specific address book contact (e.g., Calvin Armstrong).

Figure 6A:
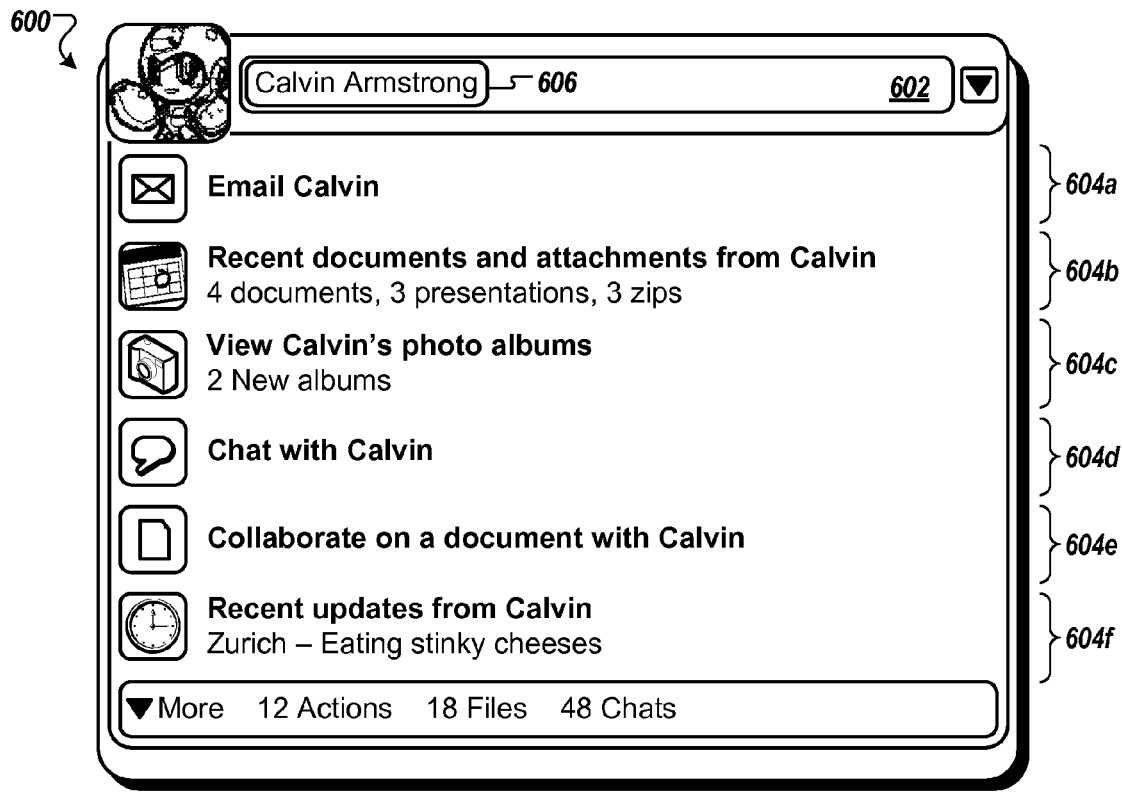
FIGS. 6A-B are examples of user interfaces for presenting query suggestions that are restricted to a particular category.

FIG. 6A is an example of a user interface 600 for presenting query suggestions that are restricted to a particular category. For example, the user interface 600 showing restricted suggestions may result from a user selecting the restriction control 312 within the user interface 300. The user interface 500 includes a query input control 602 and multiple suggestions 604a-f. The search application has restricted the suggestions 604a-f to items related to the contact "Calvin Armstrong." The user interface 500 indicates that the "Calvin Armstrong" restriction is active by including an identifier for the "Calvin Armstrong" contact within a bubble 606 in the query input control 602.

The suggestions 604a-f include a suggestion to send an email to Calvin, a suggestion to view documents and attachments from Calvin, a suggestion to view photographs from Calvin, a suggestion to initiate a chat session with Calvin, a suggestion to collaborate on a document with Calvin, and a suggestion to view recent status updates or tweets (e.g., twitter messages) from Calvin. The user interface 600 also includes a more control 608. A user can select the more control 608 to request that the search application present additional suggestions that are not currently presented.

In some implementations, the suggestions 604a-f can be provided by modules, such as the data provider modules 208a-d. In some implementations, the suggestions 604a-f can include further actions or restrictions. For example, the suggestion 604a for sending an email to Calvin can include an action control for selecting a file to email to Calvin and/or an action control for selecting a particular email application for sending the email to Calvin. In another example, the suggestion 604c for Calvin's photo albums can include a restriction control. The photo album restriction control can be selected to request that the suggestions be restricted to items related to Calvin Armstrong and photo albums, such as a suggestion to comment on a photo, add a photo to one of Calvin's albums, or create an album for sending to Calvin. In some implementations, the data provider modules 208a-d provide the actions and/or the restriction operations to the search application for use in the user interface 600.

The user can input a new query portion (e.g., "sm") in the query input control 602. The search application receives the new query portion and provides the new query portion to the data provider modules.

In some implementations, the search application also provides the "Calvin Armstrong" restriction to the data provider modules. The data provider modules and/or data providers search the data sources using the new query portion and restrict the suggestions to those items related to "Calvin Armstrong."

In some implementations, the search application only provides the new query portion to data provider modules associated with "Calvin Armstrong," such as the data provider module and data provider for accessing the data source 212b that includes an index of the device (e.g., address book contacts, messages, and documents).

In some implementations, the search application provides the new query portion to the data provider modules and then the search application restricts the suggestions provider by the modules. For example, the data provider module 208a can pass the new query portion to the data provider 210b. The data provider 210b can search the data source 212b for files that include the new query portion "sm." The merging module 214 can then receive the suggestions from the data provider module 208a and restrict those suggestions to items that are related to "Calvin Armstrong."

Figure 6B:
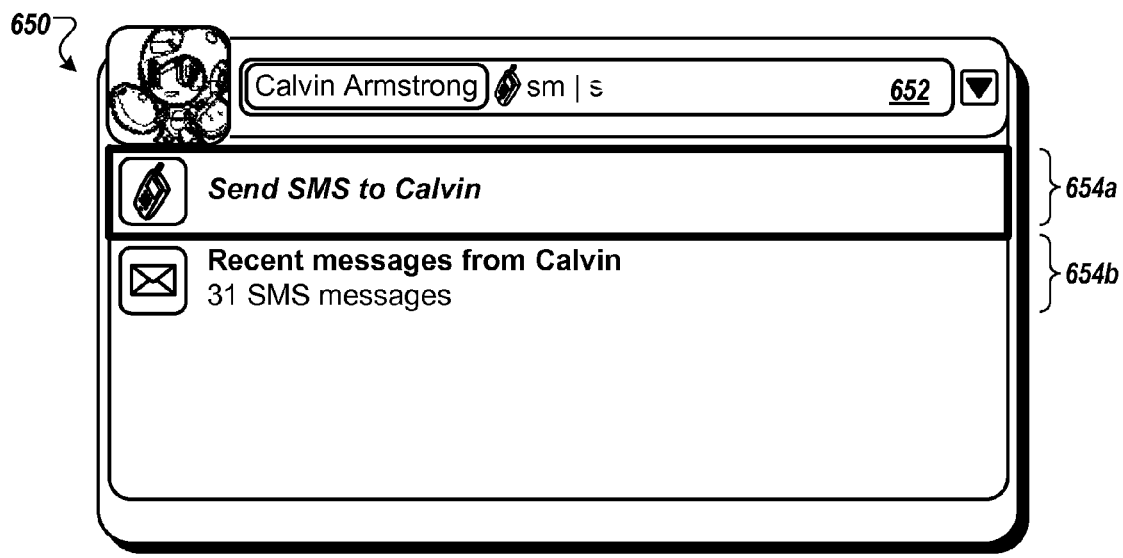

FIG. 6B is an example of a user interface 650 for presenting query suggestions from a particular category. The user interface 650 includes a query input control 652 and multiple suggestions 654a-b. The query input control 652 includes the new query portion "sm." The data provider modules provide the suggestion 654a for sending an SMS message to Calvin and the suggestion 654b for viewing recent SMS messages from Calvin. The suggestion 654a is currently selected. Accordingly, the search application appends, to the new query portion ("sm"), the remainder of the matching term ("s") within the query input control 652. The query input control 652 also includes the icon associated with the suggestion 654a, indicating that the selected action sends an SMS message to Calvin's mobile device.

In some implementations, upon activation of the suggestion 654a, the search application initiates an SMS messaging application for sending the SMS message. In some implementations, the search application can prompt the user for the SMS text without initiating an SMS application that is separate from the search application. In some implementations, the user can input the body of the SMS message text within the query input control 652. For example, upon activating the suggestion 654a, the search application can create a bubble (in addition to the "Calvin Armstrong" bubble) for the SMS message action. The search application can reset the query input control 652 to remove the existing "sm" query portion. The search application can then receive the body of the SMS message in the query input control 652.

In some implementations, the suggestion 654a includes separate controls for initiating an external SMS application versus inputting the body of the SMS message within the user interface 650. For example, the suggestion 654a can include an action control for opening an external messaging application and a restriction control for restricting the query input to be the body of the SMS message.

In some implementations, this final restriction does not provide any additional search suggestion items. Rather, the search application may expect a final input from the user (e.g., the input of the message body within the query input control 652). Alternatively, a user may first input a text body within the query input control prior to selecting any actions or restrictions. The search application can then determine that the input is a message body (e.g., where the message begins with "dear" or "email to") and presents action suggestions for the message in the list of suggestions, such as a "send email" action.

In another example, the user can input a message body beginning with "dear calvin." The search application can recognize the beginning of the query portion as an addressed message and accordingly presents suggestions related to sending a message to contacts having a name including the text "calvin," such as "send email to Calvin Armstrong" and "send email to Calvin Hobbes."

In another example, the user may input a query portion and a command for a first restriction, such as the "Calvin Armstrong" contact restriction, and then the message body (e.g., beginning with "dear calvin"). The search application then presents related suggestions, such as a "send email to Calvin Armstrong" action.

In some implementations, the search application stores the rate at which the user inputs characters into the query input control. The search application uses the rate at which the user inputs characters to determine when to update the list of suggestion items. For example, the search application can determine an average rate at which the user inputs characters. When a pause after a character input exceeds this average rate by a predetermined amount (e.g. ten percent more than the average or one tenth of a second more than the average), then the search application provides a new list of search suggestion items.

Figure 7A:
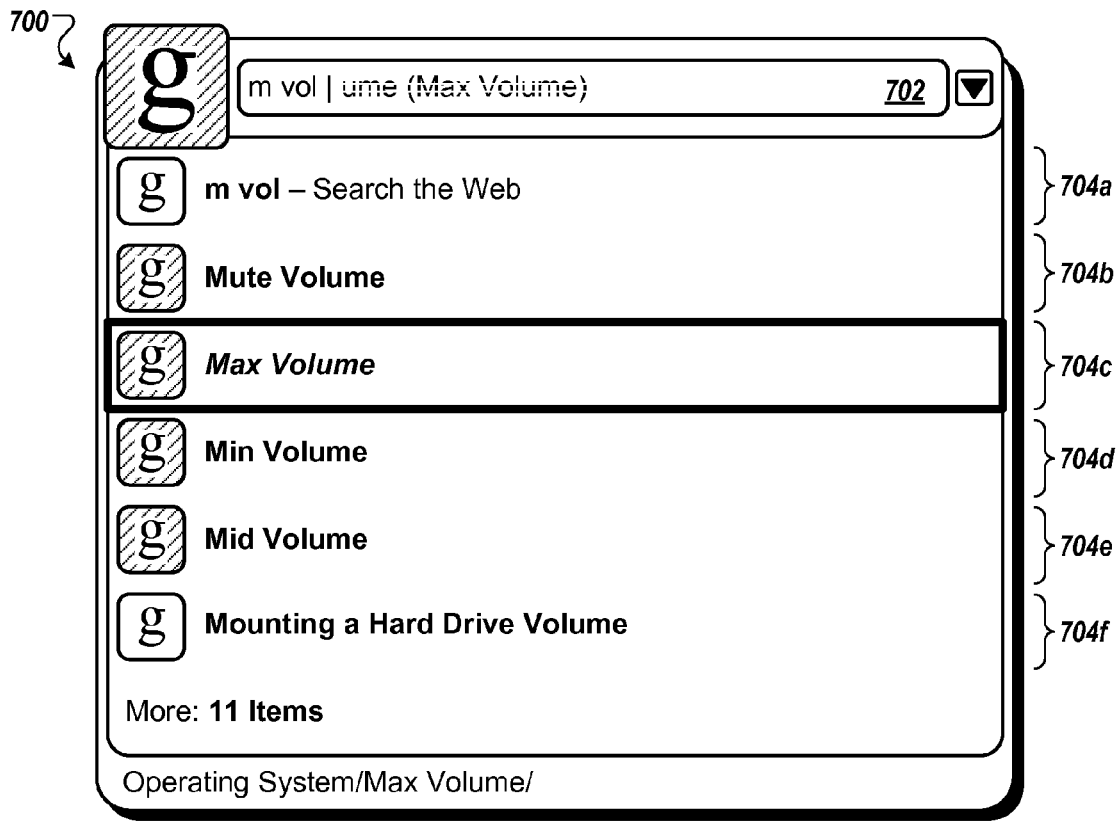
FIGS. 7A-B are examples of user interfaces for presenting query suggestions from commands in an external application or operating system.

FIG. 7A is an example of a user interface 700 for presenting query suggestions including commands in an operating system. For example, the operating system command suggestions can include help topics provided by the operating system of the computing device at which the search application operates. In another example, the operating system command suggestions can include commands from a menu provided by the operating system, such as a "Start" menu or a system menu. Further, the operating system command suggestions can include actions provided by the operating system, such as volume control, hard drive or other memory maintenance, security settings, and shutdown or sleep options. The operating system command suggestions can also include applications provided by the operating system, such as a clock application, a calculator application, and a media player application.

The user interface 700 includes a query input control 702 and multiple suggestion 704a-f. As shown in FIG. 7A, the user has entered the query portion "m vol" within the query input control 702. The search application has provided the "m vol" query portion to the data provider module and the search application has received and sorted the suggestions 704*a-c*. The suggestion 704*a* is a suggestion to perform a web search using the "m vol" query portion. The suggestions 704*b-e* are suggestions to mute, maximize, minimize, and move to the middle the audio volume for the computing device. The suggestion 704*f* is a help topic for mounting a hard drive volume.

As shown in FIG. 7A, the user has navigated down to the suggestion 704*c*. In this example, the query portion includes a first part ("m") matching a first part ("Max") of the identifier for the suggestion 704*c* and the query has a second part ("vol") matching a second part ("Volume") of the identifier for the suggestion 704*c*. The search application appends the remainder of the second part of the identifier of the suggestion 704*c* to the query portion in the query input control 702. In addition, due to the suggestion 704*c* and the query portion not having an exact substring match (e.g., one cannot be found completely within the other), the search application also appends an identifier of the suggestion 704*c* to the query portion enclosed in parentheses.

In some implementations, the search application can provide suggestions from the contents of files that are currently open within an application (e.g., a word processor or an integrated development environment) that is external to the search application. In some implementations, the external application provides an interface for a data provider to interrogate the external application. For example, to determine which files are open and/or to retrieve the current contents of the files. In some implementations, the external application includes a plug-in or add-on for communicating with the data provider.

In some implementations, other data from external applications can be retrieved by a data provider and provided as a suggestion item. For example, a data provider can retrieve queries previously performed by an external web browser application. The web browser can provide an interface for the data provider or the web browser can include a plug-in or add-on for providing the previously performed search queries to the data provider. A previously performed query from the external browser can then be provided as a suggestion where the query portion in the query input control matches a portion of the previously performed query. For example, the suggestion 304*f* of FIG. 3 can include a previously performed query from a browser application that is external to the search application. In some implementations, the external browser also operates at the computer device along with the search application. In some implementations, the external browser, the plug-in, and/or the data provider can save the previously performed queries in a storage device. The data provider can then later access the storage device to search for suggestions.

Figure 7B:
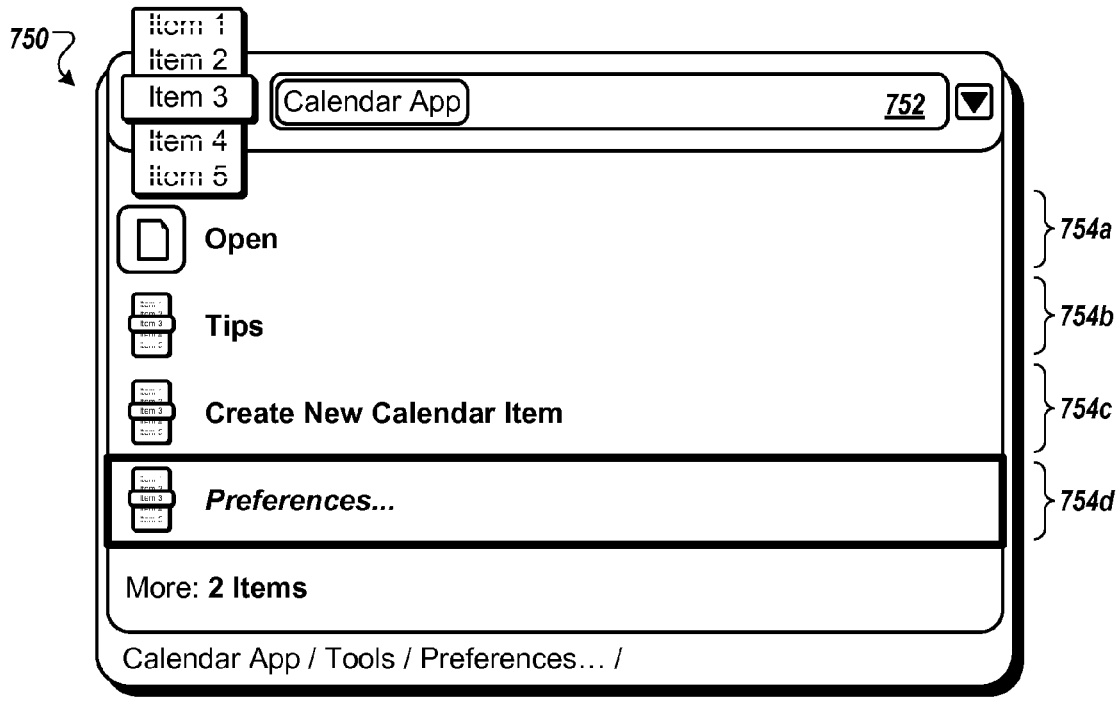

Another example of other data from an external application includes commands and/or menu items from the external application. FIG. 7B is an example of a user interface 750 for presenting query suggestions from commands or menu items in an external application. The user interface 750 includes a query input control 752 and multiple suggestions 754*a-d*. The query input control 752 indicates that the search application is currently restricting the suggestions to items related to a calendar application.

The suggestion 754*a* is an action for opening the calendar application. The user can select the suggestion 754*a* to open the calendar application. The suggestions 754*b-c* are commands and menu items from the calendar application. The user can select one or more of the suggestions 754*b-c* to activate the corresponding menu item in the external application where the menu item was found.

In some implementations, the search application presents commands and menu item suggestions from an external application when the external application is selected as a restriction condition. In some implementations, the search application presents command and menu item suggestions from an external application that is currently in the foreground of the operating system or is at a layer that is presented immediately below the search application within the operating system. In some implementations, the search application presents command and menu item suggestions from external applications that currently open within the operating system of the computing device.

In some implementations, the external application or a plug-in within the external application provide the commands and menu items to the data provider. In some implementations, the data provider retrieves the commands and menu items from the external application as the user inputs the query portion and the query is performed.

In some implementations, the data provider retrieves the commands and menu items prior to performing queries for the commands and menu items. For example, the data provider can retrieve the commands and menu items from the external application and store the retrieved commands and menu items in a storage device. The stored commands and menu items can be indexed for faster querying. The data provider can then query the storage device using the query portion from the user.

In some implementations, the data provider may access a list of stored commands and menu items without retrieving the commands and menu items from the application. The data provider can include or can have access to (e.g., over a network such as the Internet) the stored commands and menu items. The data provider and/or the search application can retrieve identifying information for the external application, such as its name, folder path, and version. The data provider can use the indentifying information for the external application to perform a lookup of the commands and menu items associated with the particular external application and performs the query using the query portion entered by the user.

Figure 8:
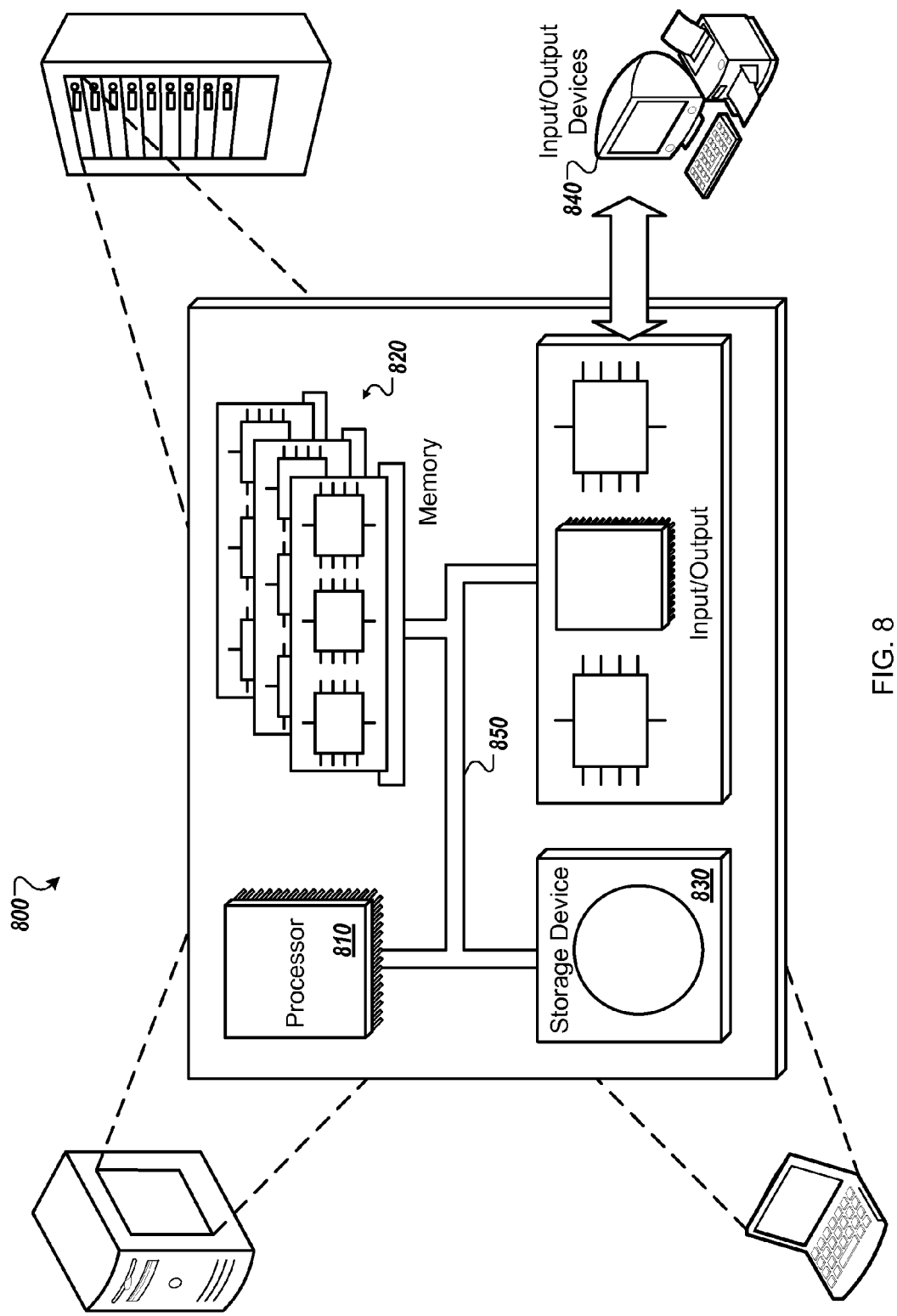
FIG. 8 is a schematic diagram showing an example of a generic computing system that can be used in connection with computer-implemented methods described in this document.

FIG. 8 is a schematic diagram of a computing system 800. The computing system 800 can be used for the operations described in association with any of the computer-implement methods and systems described previously, according to some implementations. The computing system 800 includes a processor 810, a memory 820, a storage device 830, and an input/output device 840. Each of the processor 810, the memory 820, the storage device 830, and the input/output device 840 are interconnected using a system bus 850. The processor 810 is capable of processing instructions for execution within the computing system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the computing system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the computing system 800. In some implementations, the storage device 830 is a computer-readable medium. In various different implementations, the storage device 830 may be a floppy disk device, a hard disk device, an optical disk device, or a tape device.

The input/output device 840 provides input/output operations for the computing system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the search application 104 can be included in mobile computing devices in addition to desktop computing devices, and suggestions can be displayed in a manner that differs from that shown in FIG. 3. Also, partial queries and other information may be parsed or otherwise edited in manners not explicitly discussed here before being supplied to various components, and the results from those components may likewise be modified in various manners. Also, although certain actions have been shown, for clarity, as occurring on a client or a server, the actions may be performed by various other modules or components either on servers or clients or vice-versa, as appropriate.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
providing a partial query term to multiple data provider modules, each data provider module being adapted to search at least one data source using the partial query term;
receiving a plurality of search suggestion items responsive to the partial query term from two or more of the data provider modules;
grouping the plurality of search suggestion items into a plurality of groups, each group corresponding to at least one data provider module, wherein the grouping is based on the data provider module from which each search suggestion item was received; and
providing for display a representation of each group associated with at least one data provider module and one or more of the respective search suggestion items included in the associated group through a user interface.

2. The computer-implemented method of claim 1 further comprising receiving from the user, through the computing device, an input including a restriction condition for the search suggestion items and restricting the search suggestion items to one or more of the search suggestion items that have a relationship with the restriction condition.

3. The computer-implemented method of claim 1 wherein each group is associated with a category, and wherein the categories comprise one or more of applications, web pages, contacts, other, and documents.

4. The computer-implemented method of claim 1, further comprising:
receiving data indicating a user selection identifying one of the search suggestion items from the user interface; and
rendering a status bar indicating the user selection, wherein the status bar comprises at least one action control, a number and a type of the at least one action control being based on a type of the search suggestion item identified by the user selection.

5. The computer-implemented method of claim 4 wherein the search suggestion item identified by the user selection is a contact, and wherein the at least one action control comprises an email action control, a call action control, and a short message service (SMS) action control.

6. The computer-implemented method of claim 4 wherein the search suggestion item identified by the user selection is a calendar, and wherein the at least one action control comprises an open action control and an add new appointment action control.

7. The computer-implemented method of claim 1 further comprising, when an exact substring match does not exist between the search suggestion item identified by the user selection and the partial query term, displaying a representation of the search suggestion item identified by the user selection adjacent to the partial query term on the user interface.

8. A system comprising:
one or more computers and one or more storage devices storing instructions that are operable, when executed by the one or more computers, to cause the one or more computers to perform operations comprising:
providing a partial query term to multiple data provider modules, each data provider module being adapted to search at least one data source using the partial query term;
receiving a plurality of search suggestion items responsive to the partial query term from two or more of the data provider modules;
grouping the plurality of search suggestion items into a plurality of groups, each group corresponding to at least one data provider module, wherein the grouping is based on the data provider module from which each search suggestion item was received; and
providing for display a representation of each group associated with at least one data provider module and one or more of the respective search suggestion items included in the associated group through a user interface.

9. The system of claim 8 further comprising receiving from the user, through the computing device, an input including a restriction condition for the search suggestion items and restricting the search suggestion items to one or more of the search suggestion items that have a relationship with the restriction condition.

10. The system of claim 8 wherein each group is associated with a category, and wherein the categories comprise one or more of applications, web pages, contacts, other, and documents.

11. The system of claim 8 wherein the operations further comprise:
receiving data indicating a user selection identifying one of the search suggestion items from the user interface; and
rendering a status bar indicating the user selection, wherein the status bar comprises at least one action control, a number and a type of the at least one action control being based on a type of the search suggestion item identified by the user selection.

12. The system of claim 11 wherein the search suggestion item identified by the user selection is a contact, and wherein the at least one action control comprises an email action control, a call action control, and a short message service (SMS) action control.

13. The system of claim 11 wherein the search suggestion item identified by the user selection is a calendar, and wherein the at least one action control comprises an open action control and an add new appointment action control.

14. The system of claim 8 further comprising, when an exact substring match does not exist between the search suggestion item identified by the user selection and the partial query term, displaying a representation of the search suggestion item identified by the user selection adjacent to the partial query term on the user interface.

15. A non-transitory computer-readable medium storing software comprising instructions executable by one or more computers which, upon such execution, cause the one or more computers to perform operations comprising:
providing a partial query term to multiple data provider modules, each data provider module being adapted to search at least one data source using the partial query term;
receiving a plurality of search suggestion items responsive to the partial query term from two or more of the data provider modules;
grouping the plurality of search suggestion items into a plurality of groups, each group corresponding to at least one data provider module, wherein the grouping is based on the data provider module from which each search suggestion item was received; and
providing for display a representation of each group associated with at least one data provider module and one or more of the respective search suggestion items included in the associated group through a user interface.

16. The non-transitory computer-readable medium of claim 15 further comprising receiving from the user, through the computing device, an input including a restriction condition for the search suggestion items and restricting the search suggestion items to one or more of the search suggestion items that have a relationship with the restriction condition.

17. The non-transitory computer-readable medium of claim 15 wherein each group is associated with a category, and wherein the categories comprise one or more of applications, web pages, contacts, other, and documents.

18. The non-transitory computer-readable medium of claim 15 wherein the operations further comprise:
receiving data indicating a user selection identifying one of the search suggestion items from the user interface; and
rendering a status bar indicating the user selection, wherein the status bar comprises at least one action control, a number and a type of the at least one action control being based on a type of the search suggestion item identified by the user selection.

19. The non-transitory computer-readable medium of claim 18 wherein the search suggestion item identified by the user selection is a contact, and wherein the at least one action control comprises an email action control, a call action control, and a short message service (SMS) action control.

20. The non-transitory computer-readable medium of claim 15 further comprising, when an exact substring match does not exist between the search suggestion item identified by the user selection and the partial query term, displaying a representation of the search suggestion item identified by the user selection adjacent to the partial query term on the user interface.

21. The method of claim 1, wherein the data provider modules comprise two or more of an application launcher module, a web search suggestion module, a web page bookmark suggestion module, and a web page module.

* * * * *